United States Patent
Peterka et al.

(10) Patent No.: US 8,873,760 B2
(45) Date of Patent: Oct. 28, 2014

(54) SERVICE KEY DELIVERY SYSTEM

(75) Inventors: Petr Peterka, San Diego, CA (US);
Kuang M. Chen, San Diego, CA (US);
Ambikacharan P. Makam, San Diego, CA (US); Jiang Zhang, La Jolla, CA (US)

(73) Assignee: Motorola Mobility LLC, Chicago, IL (US)

( * ) Notice: Subject to any disclaimer, the term of this patent is extended or adjusted under 35 U.S.C. 154(b) by 365 days.

(21) Appl. No.: 12/974,972

(22) Filed: Dec. 21, 2010

(65) Prior Publication Data

US 2012/0159173 A1    Jun. 21, 2012

(51) Int. Cl.
*H04L 29/06* (2006.01)
*H04L 9/08* (2006.01)

(52) U.S. Cl.
CPC .............. *H04L 9/083* (2013.01); *H04L 9/0822* (2013.01); *H04L 2209/60* (2013.01)
USPC .......................................... 380/279; 713/171

(58) Field of Classification Search
CPC .... H04L 9/0822; H04L 2209/60; H04L 9/083
USPC ............... 380/35, 36, 277, 278, 279; 713/171
See application file for complete search history.

(56) References Cited

U.S. PATENT DOCUMENTS

| | | | | |
|---|---|---|---|---|
| 5,485,577 A * | 1/1996 | Eyer et al. | ......................... | 726/17 |
| 5,768,379 A * | 6/1998 | Girault et al. | .................. | 713/185 |
| 5,787,173 A * | 7/1998 | Seheidt et al. | ................. | 380/277 |
| 6,157,723 A * | 12/2000 | Schultz | ........................... | 380/273 |
| 6,346,890 B1 * | 2/2002 | Bellin | ........................... | 340/9.11 |
| 6,483,848 B1 * | 11/2002 | Miura et al. | ................... | 370/465 |
| 6,683,526 B2 * | 1/2004 | Bellin | ........................... | 340/3.43 |
| 6,782,103 B1 * | 8/2004 | Arthan et al. | .................. | 380/278 |
| 7,200,233 B1 * | 4/2007 | Keller et al. | .................. | 380/268 |
| 7,313,236 B2 * | 12/2007 | Amini et al. | ..................... | 380/42 |
| 7,386,026 B1 * | 6/2008 | Gold | .............................. | 375/130 |

(Continued)

FOREIGN PATENT DOCUMENTS

EP    1267572 A2    12/2002
EP    2334070 A1    6/2011

OTHER PUBLICATIONS

Patent Cooperation Treaty, "International Search Report and Written Opinion of the International Searching Authority," for Int'l Application No. PCT/US2011/065010; Apr. 12, 2012.

(Continued)

*Primary Examiner* — David Garcia Cervetti
(74) *Attorney, Agent, or Firm* — Fox Rothschild LLP

(57) ABSTRACT

A Service Key Delivery (SKD) system for delivering a service keys to client devices in a communications network. The delivered service keys are operable to be used to decrypt an encrypted key operable to be used to decrypt an encrypted digital content. The SKD system includes a data input interface for receiving a distribution time frame for the keys and a listing of client device identifications. The SKD system also includes a scheduling module to partition at least part of the distribution time frame into a number of time slots in which the number may be based on a variety of factors. The scheduling module assigns the time slots in the partitioned part of the distribution time frame to the client devices based on the identifications in the listing. The SKD system also includes a message generator configured to send key delivery messages to the client devices.

26 Claims, 4 Drawing Sheets

(56) References Cited

U.S. PATENT DOCUMENTS

| | | | |
|---|---|---|---|
| 7,693,284 B2* | 4/2010 | Kloos | 380/270 |
| 8,228,892 B2* | 7/2012 | Takahashi et al. | 370/350 |
| 2002/0110245 A1* | 8/2002 | Gruia | 380/278 |
| 2002/0136407 A1* | 9/2002 | Denning et al. | 380/258 |
| 2003/0053629 A1* | 3/2003 | Knapen | 380/277 |
| 2003/0172165 A1* | 9/2003 | Xu et al. | 709/228 |
| 2005/0008158 A1* | 1/2005 | Huh et al. | 380/256 |
| 2005/0074125 A1* | 4/2005 | Chavanne et al. | 380/278 |
| 2005/0135609 A1* | 6/2005 | Lee et al. | 380/30 |
| 2006/0062319 A1* | 3/2006 | Kloos | 375/264 |
| 2007/0146820 A1* | 6/2007 | Asazu et al. | 358/479 |
| 2007/0195956 A1* | 8/2007 | Gavette | 380/277 |
| 2008/0137850 A1* | 6/2008 | Mamidwar | 380/202 |
| 2008/0272934 A1* | 11/2008 | Wang et al. | 340/870.11 |
| 2009/0100475 A1* | 4/2009 | Sharifi | 725/62 |
| 2010/0272256 A1* | 10/2010 | Baras et al. | 380/46 |
| 2010/0296655 A1* | 11/2010 | Solow et al. | 380/279 |
| 2011/0047386 A1* | 2/2011 | Lu et al. | 713/176 |

OTHER PUBLICATIONS

Open Mobile Alliance Ltd., "OMA DRM v2.0 Extensions for Broadcast Support", Draft Version 1.1, Jul. 4, 2008.

Open Mobile Alliance Ltd., "OMA DRM v2.0 Extensions for Broadcast Support", Draft Version 1.0, Apr. 24, 2006.

* cited by examiner

SERVICE KEY DELIVERY SYSTEM

BACKGROUND

Communication networks are often the medium through which digital content distributors distribute protected content from digital content distribution facilities. Content distribution services employ a wide variety of security measures in order to prevent the unauthorized use or reproduction of protected content. A conditional access system (CAS) architecture is one type of security measure.

A CAS architecture is a technology scheme which utilizes encryption technology which may include delivering messages including different types of encryption keys to client devices. In the CAS architecture, keys may be used for various encryption and decryption tasks at, for example, a headend of a cable TV distribution network and at the client devices. A CAS architecture generally calls for a client device to have current encryption keys as a pre-requisite for enabling the client device to decrypt or unlock digital content delivered to it which has been protected during delivery through encryption.

In many CAS architectures, typically multiple keys may be needed to decrypt content. However, it is often not easy to deliver all the keys to the client devices. In some instances, the client devices may not be connected to the network, such as for portable client devices. In other instances, the client devices may be turned off and thus are unable to receive the keys. As a result, a user may be unable to access encrypted content in a timely manner.

For some types of encryption keys, depending on the CAS architecture adopted by the distributor, new keys are sent to client devices to replace previously distributed keys used for a period of time at the client devices in the CAS architecture. The content distributors operating the headend send the new keys on a regular basis to better protect their digital content. This replacement practice is based on the assumption that a previously utilized and/or distributed key for encryption/decryption may be expired or compromised.

The value and variety of digital content provided to client devices has grown enormously in recent years. Some types of highly popular content are known to attract scofflaws with an enhanced technical skill set which they often use in seeking to obtain unauthorized access to protected content. There are also a growing number of content sources. Also, highly popular and specialized varieties of digital content often mandate that new keys be delivered and installed at the client devices. The installation generally needs to be completed before the client devices may decrypt, access and/or display digital content which has been delivered to the client devices in an encrypted state.

To address these systematic demands for greater protection, digital content distributors are seeking to provide and replace certain types of keys with a high frequency and at irregular intervals. Some distributors have attempted to address these needs by repeatedly sending messages with the new keys to the client devices in wide distribution broadcasts. These repeated messages are also sent at accelerated rates of distribution, with shorter intervening time intervals between the repeated transmission, of similar messages carrying identical new keys to the same target population of client devices. In essence, these efforts are brute force attempts to ensure that any expiring keys at the client devices are replaced with new keys before the old ones expire.

These practices are wasteful of the available bandwidth on the communications networks which could otherwise be used for providing content, messages or other information to the client devices. Also, brute force distribution practices may not adequately ensure that the appropriate new keys are successfully and timely received at the targeted client devices.

In the case of mobile (i.e., portable) client devices, especially those which rely on wireless communication networks and battery power, the costs associated with repeated and widely broadcasted messages are especially high. This is partly due to the unpredictability of the mobile devices to having access to a communications network. Lack of service often occurs when mobile devices are located in a poor reception area. Also, communications network access for the mobile client devices can also be inhibited or lost due to their reliance upon powering down when not in use in order to preserve their limited battery life.

BRIEF SUMMARY OF THE INVENTION

Systems, methods and client devices are disclosed which address the described difficulties associated with the systematic demands for greater protection by digital content distributors when seeking to provide or replace encryption keys, especially when delivering them by a managed distribution other than a brute force method. A Service Key Delivery (SKD) system, such as an SKD system 200 described in greater detail below, may be utilized for delivering service keys used for decryption purposes to a population of client devices in a communications network. Service keys for decryption are keys used in decrypting other keys which are themselves encrypted. These other keys, after being decrypted via a service key for decryption, may then be operable to decrypt other encrypted items such as encrypted digital content.

The SKD system 200 delivers service keys for decryption, such as a service key for decryption 142b, described below, according to time slots determined through a scheduling module 203, also described further below, in the SKD system 200. According to an embodiment, the SKD system 200 may receive feedback information from the client devices. The SKD system 200 may utilize the feedback information in determining how the time slots are assigned by the scheduling module 203. By scheduling the delivery of the service keys for decryption 142b, using the scheduling module, this can alleviate the shortcomings associated with sending widely broadcast repeat messages sent with identical new keys to the same client devices at accelerated rates of distribution. In addition, bandwidth is preserved for other purposes and not wasted. Furthermore, the timely delivery of new service keys to client devices is successfully accomplished with substantially greater assurance to the digital content distributors of their successful delivery.

According to a first embodiment is a Service Key Delivery (SKD) system to deliver service keys to client devices wherein the delivered service keys are operable to decrypt an encrypted key operable decrypt encrypted content. The SKD system includes a data input interface to receive a distribution time frame associated with distributing the service keys to the client devices, and identifications associated with the client devices. The system also includes a scheduling module executed by a computer and to partition at least a portion of the distribution time frame into a number of time slots. The number is based on at least one of a sum amount of the identifications, an even distribution over the at least a portion of the distribution time frame, a user preference, a statistic associated with client device usage data, a configuration associated with a client device registration process, and a published schedule of time slots. The system also includes a scheduling module. The scheduling module assign each time slot to a respective client device of the client devices based on the identifications to build a schedule. The system also includes a message generator to send at least one key delivery message, during the assigned time slot for each time slot, to the respective client device wherein the key delivery message includes the service key and the identification associated with the respective client device.

According to a second embodiment is a method of delivering service keys to client devices. The delivered service keys are operable to decrypt an encrypted key operable to decrypt encrypted content. The method includes receiving a distribution time frame associated with distributing the service keys to the client devices and receiving identifications associated with the client devices. The method also includes partitioning, by a computer, at least a portion of the distribution time frame into a number of time slots wherein the number is based on at least one of a sum amount of the identifications, an even distribution over the at least a portion of the distribution time frame, a user preference, a statistic associated with client device usage data, a configuration associated with a client device registration process, and a published schedule of time slots. The method also includes assigning each time slot to a respective client device of the respective client devices based on the identifications to build a schedule. the method also includes sending at least one key delivery message, during the assigned time slot for each time slot, to the respective client device wherein the key delivery message includes the service key and the identification associated with the respective client device.

According to a third embodiment is a non-transitory computer readable medium storing computer readable instructions that when executed by a computer system performs a method. The method includes receiving a distribution time frame associated with distributing the service keys to the client devices and receiving identifications associated with the client devices. The method also includes partitioning, by a computer, at least a portion of the distribution time frame into a number of time slots wherein the number is based on at least one of a sum amount of the identifications, an even distribution over the at least a portion of the distribution time frame, a user preference, a statistic associated with client device usage data, a configuration associated with a client device registration process, and a published schedule of time slots. The method also includes assigning each time slot to a respective client device of the respective client devices based on the identifications to build a schedule. the method also includes sending at least one key delivery message, during the assigned time slot for each time slot, to the respective client device wherein the key delivery message includes the service key and the identification associated with the respective client device.

According to a fourth embodiment is a client device to receive a service key wherein the received service key is operable to decrypt an encrypted key operable to decrypt encrypted content. The client device includes a processor to receive a key delivery message, during an assigned time slot assigned to the client device according to a schedule of assigned time slots. The key delivery message includes the service key and an identification associated with the client device. The client device also includes a storage device to store the service key.

BRIEF DESCRIPTION OF DRAWINGS

Embodiments are described in detail in the following description with reference to the following figures.

DETAILED DESCRIPTION OF EMBODIMENTS

Figure 1:
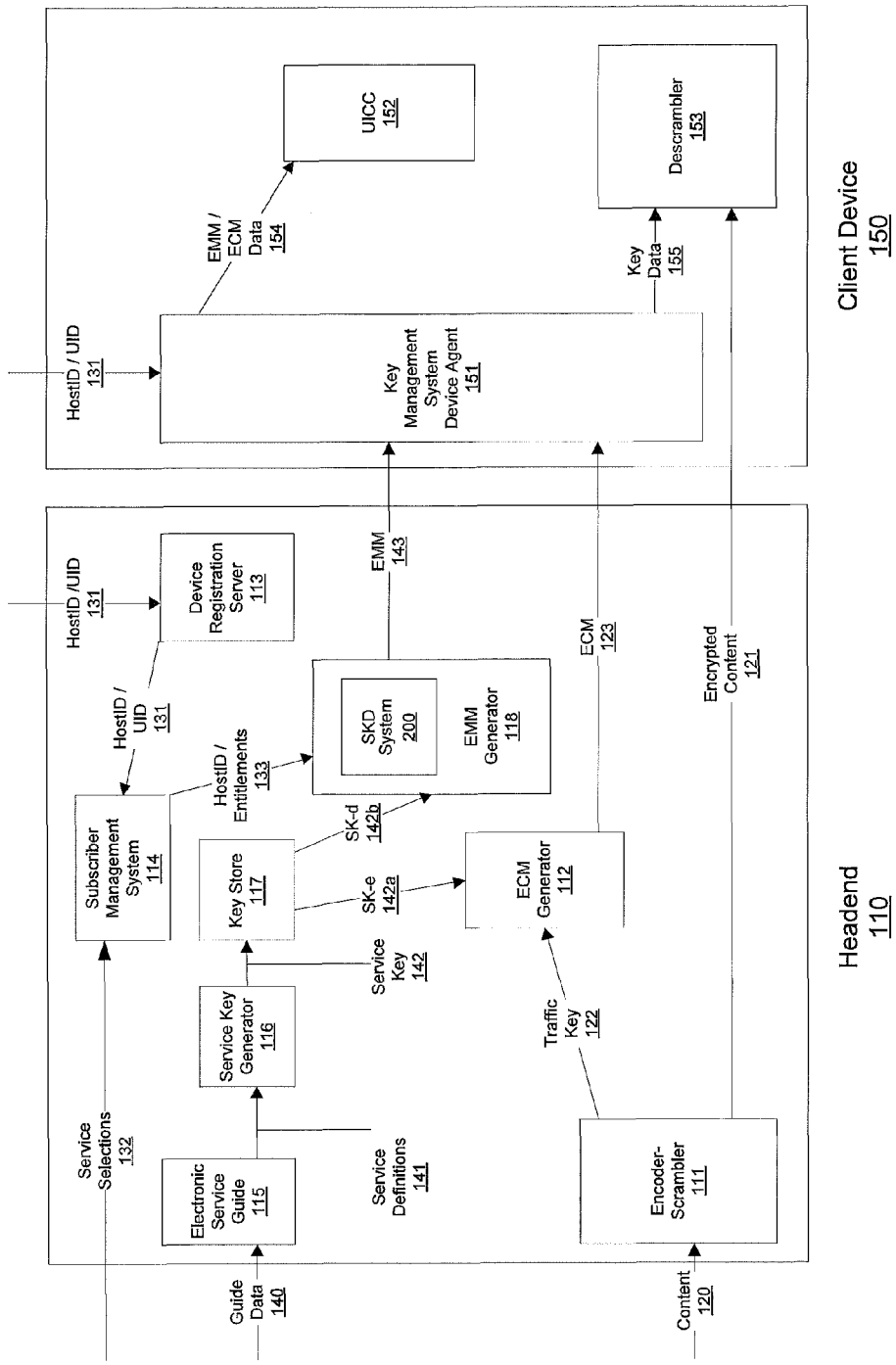
FIG. 1 is a system context diagram illustrating a CAS architecture 100 including the SKD system 200, also shown in FIG. 2, according to an embodiment.

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

1. CAS Architecture

In a CAS architecture, such as the CAS architecture 100 described in more detail below with respect to FIG. 1, two or more interrelated layers of protection may be used to incorporate different encryption processes in each layer. The different layers can be utilized together to better protect the digital content being transmitted. In encryption, a pair of keys are often used as a related pair. One key in the pair is used for encrypting digital items such as data, code or content in order to lock it into an encrypted state. A second key in the pair is used for decrypting the previously encrypted items back into a conventionally readable digital format, such as a bit stream. In general a key, whether for encryption or decryption, includes an algorithm. A key may also include other information, called key information. The keys in the pair use the key information to define or establish a correspondence or relationship with each other in the key pair. This correspondence between the encryption/decryption pair is a shared secret between these two keys. The shared secret may be an algorithm, a code, a number or some combination thereof. The shared secret may be communicated between the two keys as the key information when it is transmitted between the encrypting key and the decrypting key.

The types of digital items which may be encrypted/decrypted is not limited and includes program code, documents or other digital information in various formats, such as a bit stream. Bit streams are often used in constructing digital content involving audio/visual media such as pictures, movies, etc. In a process for encrypting a bit stream in digital content, an encrypting key can be used to convert the bit stream into a ciphertext (i.e., an unreadable code). A decrypting key is used to reverse this process. In order to perform the decryption, a decrypting key may utilize its own algorithm, often related to the algorithm in the encrypting key, and may use it to recognize the key information communicated to it from the encrypting key. For simplicity of illustration, unless described with greater specificity below, the general term key is used interchangeably for describing an encrypting key, a decrypting key, a key pair or the key information shared between an encrypting key and a decrypting key in a key pair.

FIG. 1 illustrates the CAS architecture 100, according to an embodiment. The CAS architecture 100 includes a headend 110 which communicates with the client device 150. The headend 110 includes several components which process incoming information and content for transmission via a communications network to the client device 150. In the CAS architecture 100, according to an embodiment, one layer of protection includes a traffic key 122 for encrypting and/or decrypting digital content, such as a content 120. The traffic key 122 is used to encrypt the content 120 received at the headend 110. Content 120 may be an individual piece of content or multiple pieces of content which can be related in some way or totally unrelated. The encryption process is performed in an encoder-scrambler 111 in the headend 110, according to an embodiment, and converts the content 120 to an encrypted content 121. The encrypted content 121 is then transmitted from the headend 110 outward through a communications network to client devices, such as client device 150, which receives the encrypted content 121.

The headend 110 also includes a device registration server 113, wherein the rights associated with the client devices and their hosts (i.e., the responsible parties for the client devices with respect to the headend 110) are received and stored. Device registration server 113 receives a host ID or a unit ID (HostID/UID) 131 of the client device 150, where it may be stored. The UID may be a serial number associated with the client device individually or in a grouping of client devices including client device 150. The UID is associated with the HostID at the device registration server 113 and stored in an accessible database for rights management purposes. Device registration server 113 then forwards HostID/UID 131 to a subscriber management system 114. The subscriber management system 114 manages incoming service selections 132, such as selected television programs, movies or pay per view (PPV) services received at the headend 110 from the users of the client devices, such as client device 150. The subscriber management system 114 matches the HostiD/UID 131 with its corresponding service selections to determine the service selection entitlements associated with HostiD/UID 131 and determines the appropriate HostiD/Entitlements 133.

Information about the various services, such as television programs, movies or pay per view (PPV) services, which are received as content 120 to be distributed from headend 110 are categorized as guide data 140 received and organized through the electronic service guide 115 at the headend 110. The electronic service guide 115 categorizes the guide data 140 into service definitions 141 for rights management purposes and forwards the service definitions 141 to a service key generator 116. The service key generator 116 generates service keys, such as service key 142, which are associated with the service definitions 141. The service key generator 116 forwards service keys, including service key 142, to a key store 117 where the keys are stored until they are needed by the headend 110.

A second layer of protection in the CAS architecture 100 includes a service key, such as service key 142. Like the traffic key 122, the service key 142 can include two related keys, such as the service key for encryption 142a and the service key for decryption 142b, for the separate processes of encryption and decryption of traffic key 122. However, unlike traffic key 122, the service key for encryption 142a is not used to encrypt digital content, such as content 120. Instead, the service key for encryption 142a is used to encrypt the traffic key 122 by converting the data making up the algorithms and/or key information of the traffic key 122 into ciphertext.

The encrypted traffic key 122 may then be packaged in ECM 123 and sent from the headend 110 in the ECM message stream.

Service key 142 is now described further in terms of the separate keys in the service key pair for encryption and decryption. The service key 142 used for encryption is encryption service key 142a. The key store 117 releases the encryption service key 142a to the ECM generator 112. The service key for encryption 142a encrypts the traffic key 122 which had been used to encrypt the content 120 into an encrypted content 121. The traffic key 122 for decrypting the encrypted content 121 is sent to the client device 150 via a message containing the encrypted traffic key.

The message carrying the encrypted traffic key 122 is called an Entitlement Control Message (ECM). The encrypted traffic key 122 is loaded into ECM 123 which headend 110 transmits to the client device 150.

The service key 142 used for decryption of the encrypted traffic key 122 is decryption service key 142b. This key is transmitted from the headend 110 in a type of message called an Entitlement Management Message (EMM), such as EMM 143 in the CAS architecture 100. EMM 143 may be used to deliver the service key for decryption 142b to the client device 150.

The key store 117 releases the decryption service key 142b to the EMM generator 118. At the EMM generator 118, the decryption service key 142b which may be encrypted by a symmetric unit key (i.e. a device key assigned by the host) and then loaded into EMM 143 which headend 110 transmits to the client device 150 based on a schedule determined by the SKD system 200. The SKD system 200 is described in greater detail below with respect to FIG. 2.

In the CAS architecture 100, the traffic key 122 used to decrypt the encrypted content 121 is sent in ECM 123 to the client device 150. Before the ECM 123 is sent, the encoder-scrambler 111 in the headend 110 forwards the traffic key 122 used for decryption to an ECM generator 112 which generates ECMs, such as ECM 123. ECM 123 is one delivery message, carrying the traffic key 122 for decryption, in an encrypted state, in the ECM message stream sent to the client device 150. At the client device 150, the encrypted content 121 may then be decrypted, converting it from a ciphertext back into a decrypted bit stream. In CAS architecture 100, the decryption of the encrypted content 121 occurs in a descrambler 153 in the client device 150.

When the encrypted content 121 is transmitted from the headend 110, it is sent over the communications network to client devices, such as client device 150, in the form of an information stream containing packets of the encrypted content 121. In general, at the same time the packets of the encrypted content 121 are sent from the headend 110 in the information stream, the message stream with ECM 123 is also sent from the headend 110 to the client device 150. The message stream includes a series of messages containing encrypted traffic keys, such as traffic key 122. Once received at the client device 150 along with the encrypted content 121, the traffic key 122 may be used at the client device to decrypt the encrypted content and convert it back into readable a bit stream. A traffic key 122 used for the decryption corresponds with the traffic key 122 used upstream in the encryption process performed within the headend 110 at the encoder-scrambler 111. However, before the traffic key 122 can be used for decrypting, it must itself be decrypted as described in more detail below.

A service key for decryption 142b, when received at the client device 150 is used to decrypt or unlock the encrypted traffic key 122 which arrived at the client device 150 in the ECM 123. Once decrypted, the traffic key 122 may then by utilized in the descrambler 153 to decrypt the encrypted content 121 also received there in the packets of the information stream. Ordinarily, a service key, such as service key 142 is not directly associated with any specific piece of digital content, such as content 120. The service key for decryption 142b may replace an expiring service key for decryption previously installed in client device 150 or provide a new service key 142b at the client device 150.

A CAS architecture, such as CAS architecture 100, may require that a client device, such as client device 150, have a current service key for decryption 142b, either replacing an expiring service key or being installed as a new service key, enabling the client device 150 to decrypt the traffic key 122. Those of skill in the art will appreciate that the key can be a new key or replacing an expired key. The decrypted traffic key 122 is then used, in turn, to decrypt the encrypted content 121 which is also received at the client device 150. An EMM, such as EMM 143, when carrying a new or replacement service key for decryption 142b, is often transmitted to the client device 150 some period of time in advance of the encrypted traffic key 122 and/or the encrypted content 121. Also, the service key for decryption 142b may be used to decrypt to multiple types of traffic keys other than traffic key 122. These other traffic keys may be associated with multiple types of content. So service keys, such as service key for encryption 142b, generally do not need to be distributed to client devices as frequently as traffic keys.

As a general matter, EMMs with service keys are transmitted to client devices less often than ECMs with traffic keys. While ECMs with traffic keys are often sent with every transmission of encrypted digital content from a headend, EMMs with service keys are commonly sent on a monthly or weekly basis. This frequency can vary depending on circumstances and the needs of a content distributor and their subscribers. As described above, distributors of encrypted digital content may vary and increase this frequency in attempts to provide better protection for their digital content if this can be done without negatively impacting service to their digital content subscribers. The messages sent including a service key for updating a previously installed service key are part of a one-way communication system in which the headend does not track or confirm whether the client device has received the key delivery messages it has sent.

2. SKD System

Figure 2:
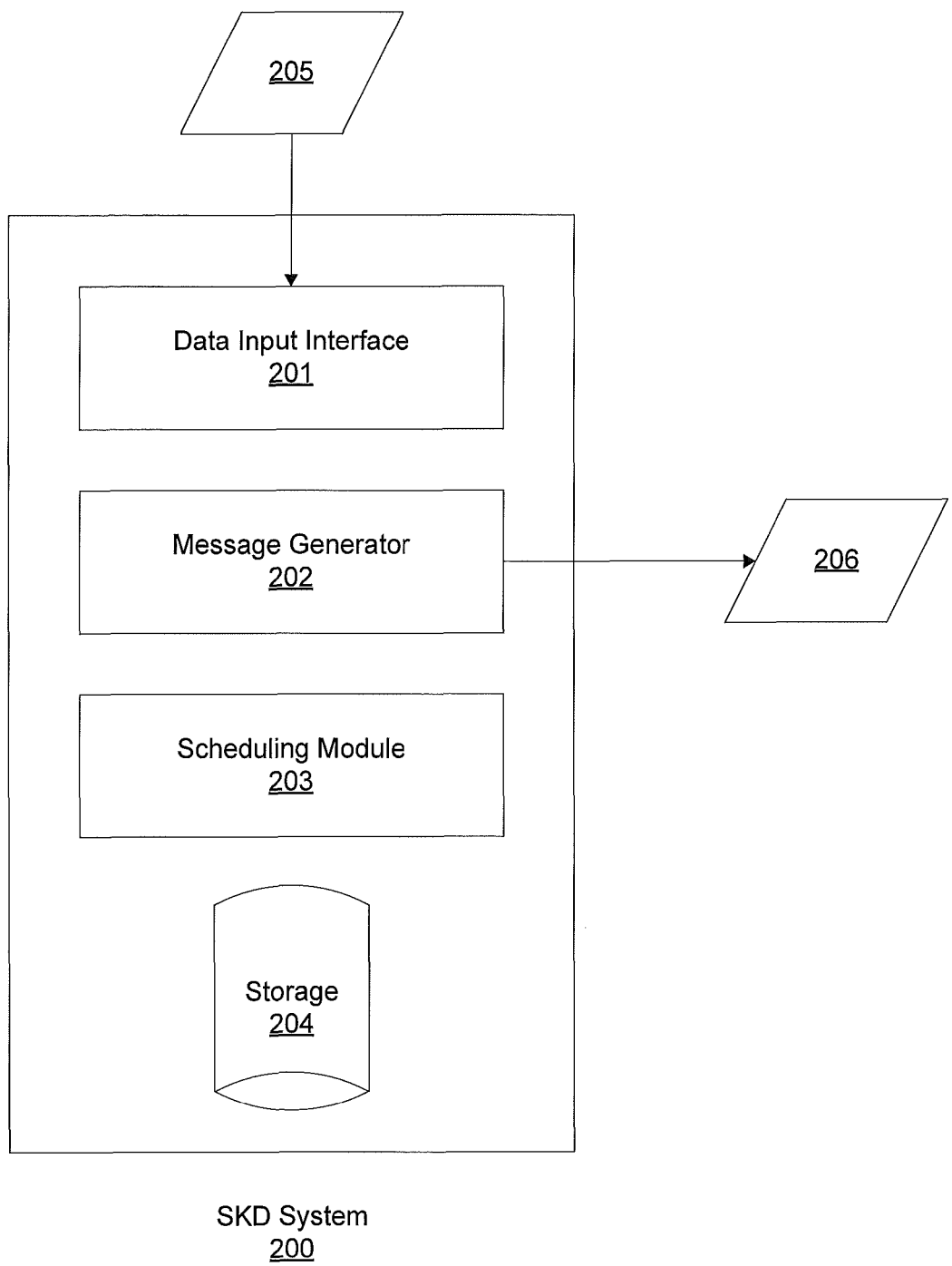
FIG. 2 is a system diagram illustrating the SKD system 200, according to an embodiment.

FIG. 2 illustrates the SKD system 200, according to an embodiment. The SKD system 200 includes a data input interface 201, a message generator 202, a scheduling module 203 and may also include a storage device 204. The data input interface 201 is configured to receive input data 205. Input data 205 includes a distribution time frame associated with distributing the service keys to the client devices, a service period associated with operating the distributed service keys at the client devices, and a listing of identifications associated with client devices in the population of client devices. Input data 205 may also include information regarding how often or how many times the key delivery message is repeated. Input data 205 may also include feedback information collected from client devices, such as client device 150. The feedback information may include client device user preference information. The feedback information may also include client device operating data such as data associated with measuring a client device capacity to receive a message in a predetermined environment, such as in a subway, in bad weather or some other environment. The feedback information may also include client device usage data, such as recorded times in which a client device was not able to receive a message.

The scheduling module 203 is configured to partition at least a portion of the distribution time frame into a number of time slots. The number of time slots is based on a sum amount of the identifications in the listing. The scheduling module 203 is also configured to assign the time slots in the partitioned portion of the distribution time frame to the client devices based on the identifications in the listing to build a schedule.

The scheduling module 203 may assign time slots in many different ways. The schedule is used by the SKD system 200 to determine at what time and to which client device to send the services keys so as to enhance the assurance of successful delivery and reduce wasting of bandwidth. The schedule may also be based on a group identification of a group in which the client device 150 is included, or statistical information associated with the client device and/or the group. The schedule may also be based on user preferences, a configuration obtained during a device registration process. The schedule for each key delivery message may be stored in a database associated with a message generator.

In one example, the scheduling module 203 may assign the time slots based on a client device identification or a group identification. The delivery period, such as one month, may be divided into a number of slots (e.g. 60 seconds per slot). The EMMG sends EMMs during a given time slot only to a client device scheduled in a given slot. The assignment of a client device to a slot may be a simple function such as a client device identification associated number of time slots. In another example, the SKD system 200 may send service keys only within the last 15 days of every month and the EMM message 143 is to be repeated 5 times for each client device. In that circumstance, the delivery period of 15 days may be divided into 5 repeating periods, each being 3 days, and each repeating may be divided into 4320 time slots, each being 60 seconds (3 days×24 hours×60 slots per hour). The scheduling module 203 assigns each client device identification to modulo 4320 to associate it with a time slot (e.g. if a client device identification is 0x000012345678, the assigned slot number is 216. So the client device receives a delivery message at 3:36 AM to 3:37 AM on the 15th, the 18th, the 21st, the 24th and the 27th of every month. According to this example, the SKD system 200 is not required to update the configuration and there is no need to send a control message from the headend 110 to the client device 150.

In another example, the scheduling module 203 may assign the time slots moving over time to avoid specific user patterns. A client device user may notify the headend 110 through feedback that the client device 150 may not be available at certain times, for example, if the user is always in a subway between 7:30 AM to 8:00 AM. In this circumstance the scheduling module 203 assigns the time slots to the client device 150 such that this time frame is not assigned to the client device 150.

In another example, the scheduling module 203 may assign the time slots based on user preferences, such as if through feedback, the SKD system 200 is notified that the client device 150 is regularly placed in a charger after midnight and the assigned time slot is assigned after midnight.

In another example, the scheduling module 203 may assign the time slots based on collected statistics, such as based on the length of time associated with delivering an EMM and under identified what conditions as in while charging or when a user is watching TV, etc. The scheduling module 203 may assign the time slot for the client device 150 using the collected statistics based on circumstances in which the client device 150 is most likely to be available.

In another example, the scheduling module 203 may assign the time slots as indicated in a registration message or in an EMM indicating the next EMM delivery time slot, or a number of delivery time slots, and their duration. The SKD system 200 sends the next time slot notification in a message or in a configuration for the client device 150.

In another example, the scheduling module 203 may assign the time slots based on time slots published in a service guide associated with service guide data 140 received at the headend 110. The service guide may carry a list of client devices that belong to a group and the times that an EMM 143 is delivered to this group. The EMM 143 is broadcast so that client device 150 may utilize it and receive the time slot information in order to receive the service key.

The SKD system 200 may include a message generator 202 which may be configured to send a control message, at a predetermined time, to a population of client devices. The predetermined time may include at the initial registration of the client device, as an update to change a scheduling configuration, or in a time slot assigned to a client device or to a group of client devices for delivery of a key delivery message. The control message may include the service period and the schedule of the assigned time slots for the client devices. Usually after the control message is sent, the message generator 202 sends at least one key delivery message during the assigned time slot for that message to the target client device for that message. The key delivery message includes the service key and the identification associated with the client device receiving the key delivery message. Sending a control message is not mandatory. An algorithm may be used to calculate a schedule for sending key delivery messages which may be synchronized with a configuration of the client devices receiving the key delivery messages.

3. Client Device

As described above, the client device 150 is also part of the CAS architecture 100, as shown in FIG. 1. According to different embodiments, client device 150 may be a mobile client device, a set-top box and/or a device configured to receive satellite mobile television content. The client device 150 receives other ECMs and EMMs.

The client device 150 may receive a key delivery message at the assigned time slot according to the schedule or at other times. The key delivery message includes a service key, such as the service key for decryption 142b. The key delivery message may also include an identification associated with the client device 150. The identification may be a serial number that corresponds with a serial number stored in the UICC 152 of the client device, or a combination of the serial number with other numbers that identify a grouping of devices including the client device 150. The identification may be used for various purposes including to confirm at the client device that the correct key delivery message has been received. The client device 150 may also include a storage device 402, described in more detail below with respect to FIG. 4. The storage device 402 may store information including the schedule of assigned time slots, the service period, the service key, and the identification associated with the client device. Storage device 402 may be located within the UICC 152, as a separate memory location in the client device 150 or some combination thereof. The client device 150 may use the schedule of assigned time slots to enable receiving the key delivery message. Using the schedule, the client device 150 may provide a notification to the user in order to prompt the user to power on from a sleep mode at a specified time or to move to a better location at a specified time to enable receiving the key delivery message. The client device 150 may also utilize the schedule to coordinate an automatic power up using the power management system in the client device 150, or to schedule an automatic power down, according to the schedule, when the client device 150 is not expecting a key delivery message.

The client device 150 may also receive a control message from the headend 11 which is generated by the SKD system 200. The control message may include a schedule of the assigned time slots developed in the scheduling module 203 of the SKD system 200. The control message may also be directed to other client devices in a population of client devices which includes the client device 150. The control message may also include a service period associated with operating the received service key for encryption 142b at the client device 150. The control message is sent from the SKD system 200 to the client device 150 at a predetermined time, usually some period of time before the service period is to start or after device registration. This period of time may be a month or more in advance, a week, 48 hours, 24 hours or a matter of minutes or seconds before service period commences. The control message may also be sent after the service period is to start. Sending a control message is not mandatory. An algorithm may be used to calculate a schedule for sending key delivery messages which may be synchronized with a configuration of the client devices receiving the key delivery messages.

4. Method

Figure 3:
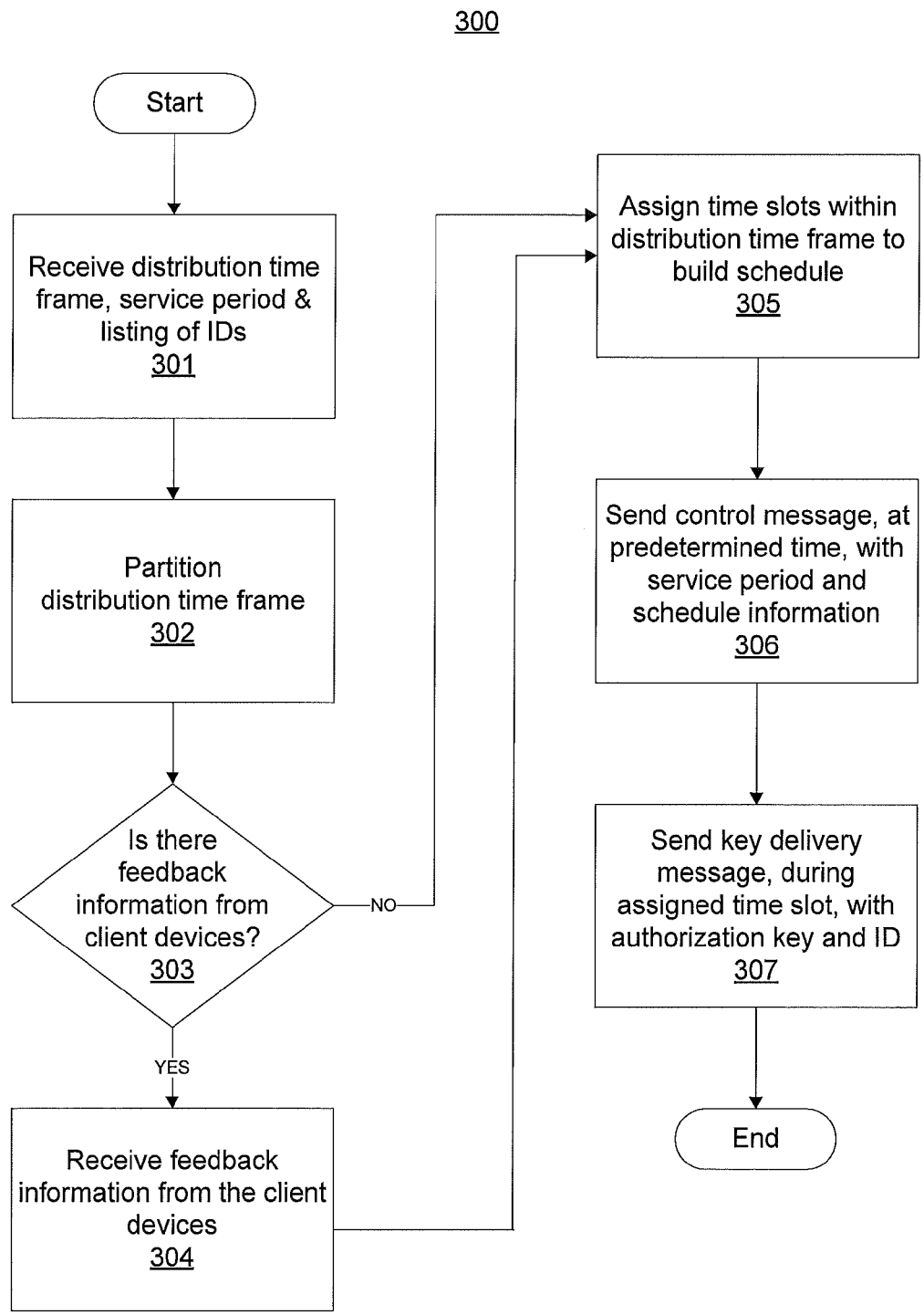
FIG. 3 is a flowchart illustrating a method of operating the SKD system 200 shown in FIG. 2, according to an embodiment.

FIG. 3 illustrates a method 300 according to embodiment, for delivering service keys to a population of client devices, including client device 150. The method is described with respect to the CAS architecture 100 using the SKD system 200 shown in FIGS. 1 and 2 by way of example and not limitation. The method may be performed in other systems. The steps of the methods may be performed in a different sequence or one or more may be omitted.

At step 301, the SKD system 100 receives input data 205 at a data input interface 201. Input data 205 includes a distribution time frame associated with distributing service keys such as service key 142 to the client devices. Input data 205 may also include a service period associated with operating the distributed service keys at the client devices and a listing of identifications, such as a listing of individual client device serial numbers and/or group identifications of a group associated with client devices in the population of client devices, or statistical data regarding the client device individual and or group identifications.

At step 302, the SKD system 100 utilizes the scheduling module 203 to partition some or all of the distribution time frame received as input data 205 into a number of time slots. The number of time slots may be based on a wide variety of factors as described above, such as a number of time slots based moving over time to avoid specific user patterns, such as when a user is always in a subway at a certain time of a day, or some other configuration, such as an even distribution of times slots during the usage period. It may also be based on user preferences, such as when a user knows the device will be mounted in a connected charger. The number of time slots may also be based on collected statistics, such as how long it takes to deliver an EMM to a client device 150. The number of time slots may also be based on a group assignment listed in a service guide and the group assignment is associated with a group of client devices, an even distribution over the at least a portion of the distribution time frame, a user preference, a statistic associated with client device usage data, a configuration associated with a client device registration process, and a published schedule of time slots. Also the number may be pre-set amount or at a limit for a select number, such as a number of client devices in the population associated with a premium subscriber ID in the CAS architecture 100.

At step 303, the SKD system 100 performs a confirmation to determine whether an feedback information has been received from or about the client devices in the population.

At step 304, the SKD system 100 receives the feedback information through the data input interface 202 and provides it to the scheduling module 203 and/or the storage device 204. The feedback information may be statistical information about a plurality of devices, data measurements or types of data. The feedback information may also be associated with individual client devices in the population, such as client device 150. The feedback information may include client device user preferences. Or the feedback information may include client device operating data, such as data associated with measuring a client device capacity to receive a message in a predetermined environment. Or the feedback information may include client device usage data, such as data associated with recorded times when a client device was not able to receive a message. Or the feedback information may include identifications associating the client devices with groupings of client devices in the population of client devices. The feedback information which is available to the SKD system 200 may be utilized by the scheduling module 203 in assigning the time slots.

At step 305, the scheduling module 203 assigns the time slots in the partitioned portion of the distribution time frame to the client devices based on any of the factors described above to build a schedule.

At step 306, the message generator 202 generates output data 206 and may send a control message from the headend 110 by the EMM generator 118, the ECM generator 112 or some other module, such as a service key distribution module that is separate from the EMM generator 118 or the ECM generator 112. The service key distribution module may reside within or outside the headend 110. The output data 206 for the control message may include the service period and/or the schedule of the assigned time slots for the client devices and the service period. The control message is not mandatory, as noted above.

At step 307, the message generator 202 generates output data 206 for sending a key delivery message which may be sent from the headend 110 by the EMM generator 118 or some other module within or outside the headend 110. The output data 206 for the key delivery message includes a service key, such as service key for decryption 142b, or another service key provided from the key store 117 and/or the identification associated with the respective client device receiving the key delivery message.

5. Computer System for Executing Software

One or more of the steps and functions described herein and one or more of the components of the systems described herein may be implemented as computer code comprising computer readable instructions stored on a computer readable storage device, such as memory or another type of storage device. The computer code is executed on a computer system, such as computer system 400 described below by a processor, such as an application-specific integrated circuit (ASIC), or other type of circuit. The code may exist as software programs comprised of program instructions in source code, object code, executable code or other formats.

Figure 4:
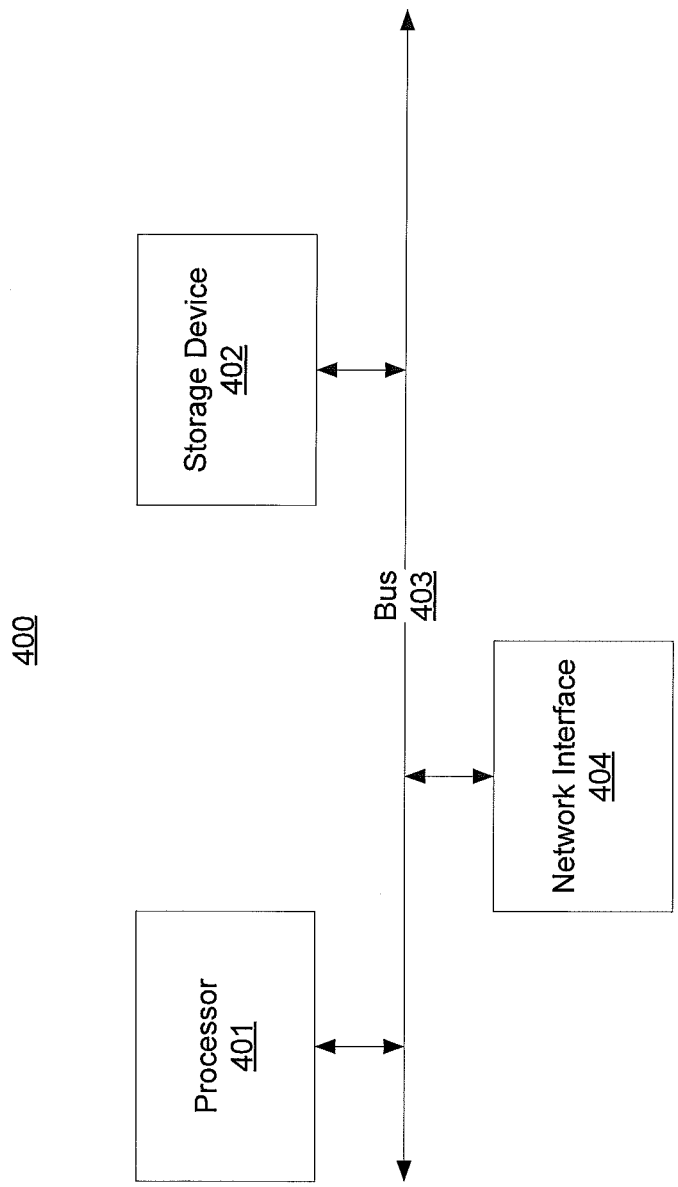
FIG. 4 is a system diagram illustrating a computer system configured to provide a hardware platform for the SKD system 200 shown in FIG. 2 or a client device 150 shown in FIG. 1, according to different embodiments.

FIG. 4 shows a computer system 400 which may be used as a hardware platform for the SKD system 200 or the client device 150. Computer system 400 may be used as a platform for executing one or more of the steps, methods, and functions described herein that may be embodied as software stored on one or more computer readable storage devices, which are hardware storage devices.

The computer system 400 includes a processor 401, or processing circuitry, that may implement or execute software instructions performing some or all of the methods, functions and other steps described herein. Commands and data from processor 401 are communicated over a communication bus 403. Computer system 400 also includes a computer readable storage device 402, such as random access memory (RAM), where the software and data for processor 401 may reside during runtime. Storage device 402 may also include non-volatile data storage. Computer system 400 may include a network interface 404 for connecting to a network. It is apparent to one of ordinary skill in the art that other known electronic components may be added or substituted in computer system 400.

The SKD systems, client devices and methods described herein overcome the wasteful practices associated with brute force distribution of service keys and helps to conserve the available bandwidth on communications networks which may otherwise be used for providing content, messages or other information to the client devices. Also, SKD systems, devices and methods ensure that the appropriate new keys are successfully and timely received at the targeted client devices such as mobile client devices 150, especially those which rely on wireless communication networks and battery power.

Furthermore, the SKD systems, devices and methods described herein are generally described with respect to a service key delivery system operable for service key distribution purposes. However, the systems, devices and methods are applicable to key delivery systems for other types of conditional access keys.

While the embodiments have been described with reference to examples, those skilled in the art are able to make various modifications to the described embodiments without departing from the scope of the embodiments as described in the following claims, and their equivalents.

What is claimed is:

1. A Service Key Delivery (SKD) system to deliver service keys to client devices wherein the delivered service keys are operable to decrypt an encrypted key operable to decrypt encrypted content, the SKD system comprising:
   a data input interface to receive
      a distribution time frame associated with distributing the service keys to the client devices, and
      identifications associated with the client devices;
   a scheduling module executed by a computer to
      partition at least a portion of the distribution time frame into a number of time slots wherein the number is based on at least one of a sum amount of the identifications, an even distribution over the at least a portion of the distribution time frame, a user preference, a statistic associated with client device usage data, a configuration associated with a client device registration process, and a published schedule of time slots, and
      assign each client device of the client devices to a different respective time slot of the number of time slots based on the identifications to build a schedule; and
   a message generator to
      send at least one key delivery message, during the assigned time slot for each time slot, to the respective client device wherein the key delivery message includes the service key and the identification associated with the respective client device.

2. The SKD system of claim 1, wherein
   the data input interface is to receive
      feedback information collected from the client devices; and the scheduling module is to
  assign the time slots based on the received feedback information.

3. The SKD system of claim 2, wherein the feedback information includes client device user preference information utilized in assigning the time slots.

4. The SKD system of claim 2, wherein the feedback information includes client device operating data utilized in assigning the time slots.

5. The SKD system of claim 4, wherein the client device operating data includes data associated with measuring a client device capacity to receive a message in a predetermined environment.

6. The SKD system of claim 2, wherein the feedback information includes client device usage data utilized in assigning the time slots.

7. The SKD system of claim 6, wherein the client device usage data includes data associated with recorded times when a client device was not able to receive a message.

8. The SKD system of claim 1, wherein the identifications associated with the client devices are also associated with groupings of client devices in the population of client devices.

9. The SKD system of claim 1, wherein the message generator is configured to send a control message to the client devices wherein the control message includes at least one of a service period and the schedule of the assigned time slots for the client devices.

10. A method of delivering service keys to client devices wherein the delivered service keys are operable to decrypt an encrypted key operable to decrypt encrypted content, the method comprising:
  receiving a distribution time frame associated with distributing the service keys to the client devices;
  receiving identifications associated with the client devices;
  partitioning, by a computer, at least a portion of the distribution time frame into a number of time slots wherein the number is based on at least one of a sum amount of the identifications, an even distribution over the at least a portion of the distribution time frame, a user preference, a statistic associated with client device usage data, a configuration associated with a client device registration process, and a published schedule of time slots;
  assigning each client device of the respective client devices to a different respective time slot of the number of time slots based on the identifications to build a schedule; and
  sending at least one key delivery message, during the assigned time slot for each time slot, to the respective client device wherein the key delivery message includes the service key and the identification associated with the respective client device.

11. The method of claim 10, the method further comprising:
  receiving feedback information collected from the client devices; and
  assigning the time slots based on the received feedback information.

12. The method of claim 11, wherein the feedback information includes client device user preference information utilized in assigning the time slots.

13. The method of claim 11, wherein the feedback information includes client device operating data utilized in assigning the time slots.

14. The method of claim 13, wherein the client device operating data includes data associated with measuring a client device capacity to receive a message in a predetermined environment.

15. The method of claim 11, wherein the feedback information includes client device usage data utilized in assigning the time slots.

16. The method of claim 15, wherein the client device usage data includes data associated with recorded times when a client device was not able to receive a message.

17. The method of claim 10, wherein the identifications associated with the client devices are also associated with groupings of client devices in the population of client devices.

18. The method of claim 10, the method further comprising sending a control message to the client devices wherein the control message includes at least one of a service period and the schedule of the assigned time slots for the client devices.

19. A non-transitory computer readable medium storing computer readable instructions that when executed by a computer system performs a method of delivering service keys to client devices wherein the delivered service keys are operable to decrypt an encrypted key operable to decrypt encrypted content, the method comprising:
  receiving a distribution time frame associated with distributing the service keys to the client devices;
  receiving identifications associated with the client devices;
  partitioning, by a computer, at least a portion of the distribution time frame into a number of time slots wherein the number is based on at least one of a sum amount of the identifications, an even distribution over the at least a portion of the distribution time frame, a user preference, a statistic associated with client device usage data, a configuration associated with a client device registration process and a published schedule of time slots;
  assigning each client device of the respective client devices to a different respective time slot of the number of time slots based on the identifications to build a schedule; and
  sending at least one key delivery message, during the assigned time slot for each time slot, to the respective client device wherein the key delivery message includes the service key and the identification associated with the respective client device.

20. The computer readable medium of claim 19, the computer readable medium further comprising instructions that perform a method, the method comprising:
  receiving feedback information collected from the client devices; and
  assigning the time slots based on the received feedback information.

21. A client device to receive a service key wherein the received service key is operable to decrypt an encrypted key operable to decrypt encrypted content, the client device comprising:
  a processor to receive a key delivery message, during an assigned time slot assigned only to the client device according to a schedule of assigned time slots for a plurality of client devices, wherein the key delivery message includes the service key and an identification associated with the client device; and
  a storage device to store the service key.

22. The client device of claim 21, wherein the processor is configured to send feedback information collected at the client device.

23. The client device of claim 22, wherein the feedback information includes at least one of client device user preference information, client device operating data and client device usage data.

24. The client device of claim 21, wherein the client device is a mobile device.

25. The client device of claim 21, wherein the processor is configured to receive satellite mobile television.

26. The client device of claim 21, wherein the processor is to receive a control message wherein the control message includes at least one of
- a schedule of assigned time slots for a population of client devices including the client device, and
- a service period associated with operating the received service key at the client device.

* * * * *